(12) United States Patent
Hashimoto et al.

(10) Patent No.: US 7,254,267 B2
(45) Date of Patent: Aug. 7, 2007

(54) ENCODER FOR VOLUME DATA

(75) Inventors: Masayuki Hashimoto, Saitama (JP); Kenji Matsuo, Saitama (JP); Atsushi Koike, Saitama (JP); Yasuyuki Nakajima, Saitama (JP)

(73) Assignee: KDDI Corporation, Tokyo (JP)

( * ) Notice: Subject to any disclaimer, the term of this patent is extended or adjusted under 35 U.S.C. 154(b) by 865 days.

(21) Appl. No.: 10/669,714

(22) Filed: Sep. 25, 2003

(65) Prior Publication Data

US 2004/0208378 A1 Oct. 21, 2004

(30) Foreign Application Priority Data

Sep. 26, 2002 (JP) ............... 2002-280941

(51) Int. Cl.
G06K 9/00 (2006.01)
G06K 9/36 (2006.01)
G06K 9/46 (2006.01)
H04B 1/66 (2006.01)
H04N 7/12 (2006.01)
H04N 11/02 (2006.01)
H04N 11/04 (2006.01)

(52) U.S. Cl. .................. 382/166; 382/248; 348/395.1; 348/398.1; 375/240.18; 375/240.19

(58) Field of Classification Search ................ 382/166, 382/232, 248, 250; 348/395.1, 398.1, 403.1; 358/426.01, 426.12, 426.14; 375/240.18, 375/240.19, 240.2; 708/203
See application file for complete search history.

(56) References Cited

U.S. PATENT DOCUMENTS 6,128,592 A * 10/2000 Miyazaki et al. ........... 704/224
6,314,452 B1 * 11/2001 Dekel et al. ................ 709/203
6,665,446 B1 * 12/2003 Kato .......................... 382/251
7,035,473 B1 * 4/2006 Zeng et al. ................. 382/251

(Continued)

FOREIGN PATENT DOCUMENTS

JP 2002-204168 7/2002

OTHER PUBLICATIONS

Menegaz et al. ("Object-based Coding of Volumetric Medical Data," Proc. 1999 ICIP, vol. 3, Oct. 24-28, 1999, pp. 920-924).*

(Continued)

*Primary Examiner*—Matthew C. Bella
*Assistant Examiner*—Yubin Hung
(74) *Attorney, Agent, or Firm*—Westerman, Hattori, Daniels & Adrian, LLP.

(57) ABSTRACT

A volume data encoder with high encoding efficiency is provided. The object of the coding is volume data which contains a plurality of tomogram planes output from a CT and an MRI. A header analysis unit separates each plane image into header information and pixel information. A header compression unit compresses the separated header information. On the other hand, a two-dimensional transform unit conducts frequency decomposition on the pixel information. A skip portion detection and table generation unit detects skip portions that are the same in all coefficients in a z-direction, and stores them in a table. A one-dimensional transform unit conducts one-dimensional transform on the pixel information for coefficients except the skip portions. A unit block division unit divides each subband into unit blocks. An entropy encoding unit determines a parameter for entropy encoding according to statistical properties of all coefficients in all unit blocks included in each class.

10 Claims, 3 Drawing Sheets

U.S. PATENT DOCUMENTS 7,068,848 B2 * 6/2006 Park et al. .................. 382/240
7,092,965 B2 * 8/2006 Easwar .................... 707/104.1

OTHER PUBLICATIONS

Kamath et al. ("Compression and Accelerated Rendering of Volume Data Using DWT," SPIE vol. 3457, Jul. 1998, pp. 296-303).*

K.J. Jones ("3-D Wavelet Image Processing for Spatial and Spectral Resolution of LANDSAT Images," SPIE vol. 3391, 1998, pp. 219-224).*

Schelkens, P. et al. *"An Overview of Volumetric Coding Techniques"* Coding of Still Pictures, ISO/IEC JTC 1/SC 29/WG 1 N2613, Jul. 15, 2002, pp. 13-22.

* cited by examiner (DIVIDED VOLUME DATA)

ENCODER FOR VOLUME DATA

BACKGROUND OF THE INVENTION

1. Field of the Invention

The present invention relates to a volume data encoder in the field of digital image processing, and in particular to a volume data encoder for encoding image data having a three-dimensional pixel arrangement (hereafter referred to as volume data) with high efficiency.

2. Description of the Related Art

It has become possible to acquire a large amount of three-dimensional medical image data in the department of radiology as a result of the renovation in the technique such as the CT and MR. Needs for compression of such images are becoming greater.

In DICOM (Digital Imaging and Communications in Medicine), which is standards for a system intended for storage and management of images in the department of radiology, JPEG (irreversible encoding) and JPEG-LS (reversible encoding), which are two-dimensional-based image encoding systems, are approved as the compression system for such images.

In encoding, and especially in reversible encoding, using the conventional two-dimensional-based image encoding as described above, there is a limit in the encoding efficiency of data. In some cases, therefore, compression brings about neither a remarkable reduction of the server capacity for storing encoded data, nor shortening of the time required for transmission. Three-dimensional wavelets are frequently used for encoding volume data. As a preceding paper concerning the three-dimensional wavelets, for example, Japanese Patent Application Laid-Open Publication No. 2002-204168 can be mentioned.

SUMMARY OF THE INVENTION

An object of the present invention is to provide a volume data encoder having a higher encoding efficiency.

In order to accomplish the object, the first feature of the present invention resides in a volume data encoder for encoding volume data that are image data having a three-dimensional spatial pixel arrangement, the volume data encoder comprises a two-dimensional transform unit for conducting two-dimensional frequency decomposition on two-dimensional consecutive images, skip detection means for detecting the same data portion which can be skipped in the frequency decomposition and encoding processing, when further conducting one-dimensional frequency decomposition and subsequent encoding processing on transform coefficients obtained from the two-dimensional transform unit, a one-dimensional transform unit for conducting the one-dimensional frequency decomposition except the portion detected by the skip detection means which can be skipped, and an encoding processing unit for conducting encoding on data subjected to the frequency decomposition in the one-dimensional transform unit, except the portion which can be skipped.

According to this feature, volume data formed of consecutive images of a CT, an MRI or the like have high correlation, and consequently the data amount of portions that can be skipped becomes large and the encoding efficiency can be improved.

The second feature of the invention resides in that the volume data encoder further comprises a unit block division unit for dividing inside of a subband block, which is obtained by conducting three-dimensional frequency decomposition on volume data obtained from the one-dimensional transform unit, into unit blocks, which are smaller three-dimensional blocks, and adaptive encoding means for conducting adaptive encoding on each of the unit blocks with a suitable encoding parameter.

According to this feature, adaptive encoding can be conducted on each of the unit blocks by using a suitable encoding parameter, and consequently the encoding efficiency can be improved.

The third feature of the invention resides in that the volume data encoder further comprises means for separating header information from pixel information, if information other than the pixel information accompanies each of a plurality of two-dimensional images forming the volume data, as the header information, wherein the header information is processed apart from the pixel information, and a result of compression using a common portion of a plurality of kinds of header information is added to encoded data.

According to this feature, a large amount of the same contents are included in DICOM headers in a series of images, except the image numbers and location information of tomogram planes, and consequently remarkable compression of the DICOM information or the like can be implemented.

DETAILED DESCRIPTION OF THE PREFERRED EMBODIMENT

Figure 1:
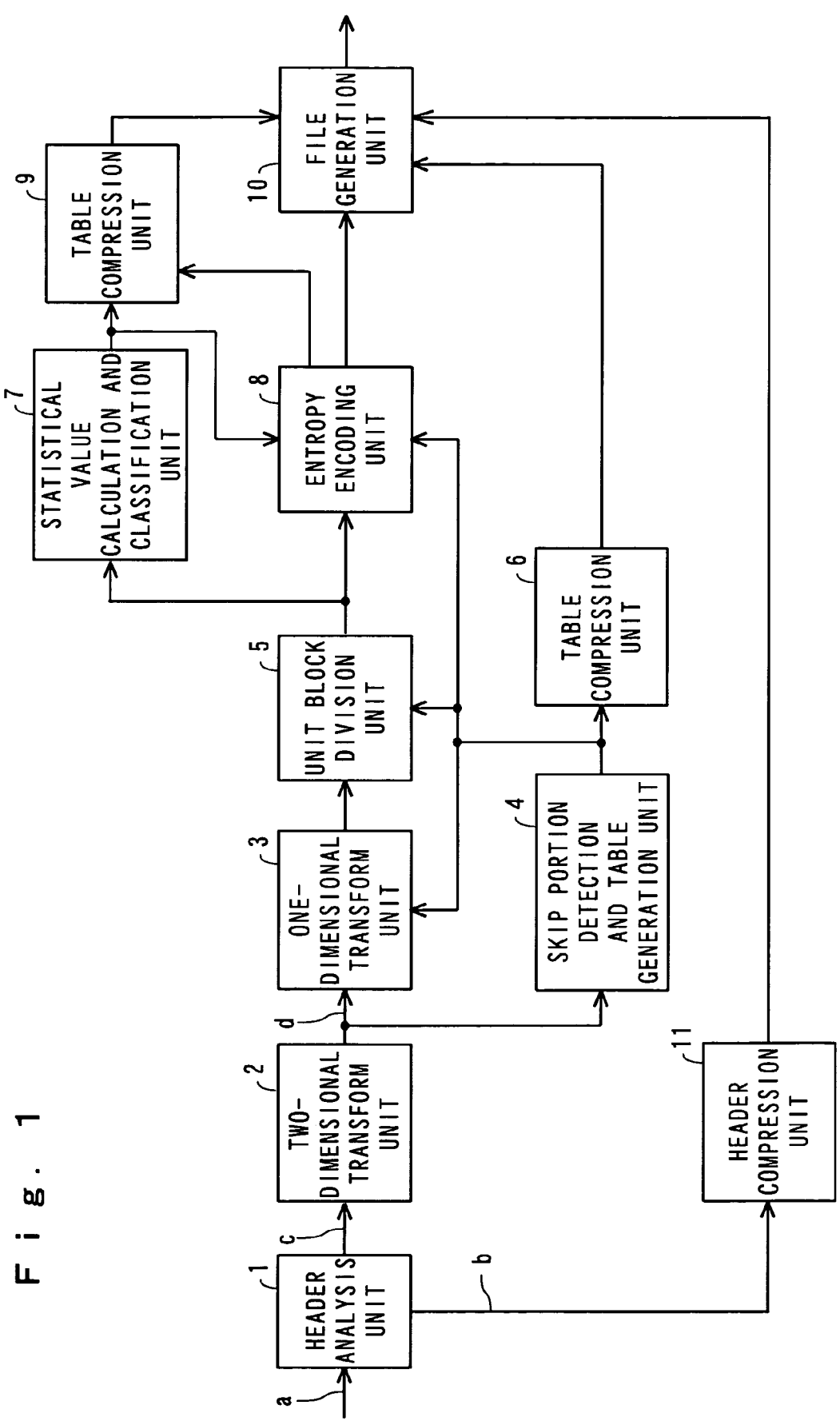
FIG. 1 is a block diagram showing a schematic configuration of an embodiment according to the present invention.

Hereafter, the present invention will be described with reference to the drawings. FIG. 1 is a block diagram showing a configuration of an embodiment according to the present invention.

Figure 2:
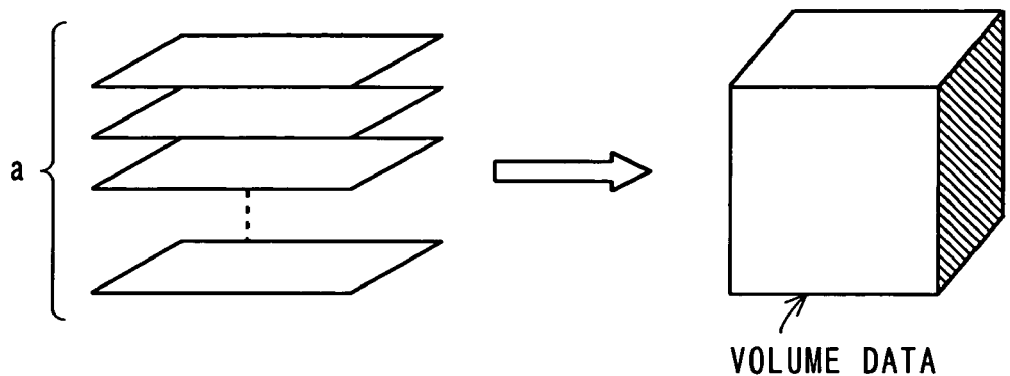
FIG. 2 is a diagram showing volume data.

First, a plurality of two-dimensional tomogram planes (a series of images) output from a CT or an MRI are supposed as an input image "a." Since these consecutive images have high correlation, it is possible to pile up these images in a three-dimensional way as shown in FIG. 2 and regard them as volume data.

The DICOM is spreading as standards for transmission protocol image format of medical images. Besides pixel value data, various kinds of information, such as patient information and information concerning the image display, accompanies a file as a header, in the DICOM. In the present embodiment, a header for all two-dimensional images is analyzed and extracted in a header analysis unit 1. An extracted header "b" is sent to a header compression unit 11, and compressed therein. Except image numbers and location information of tomogram planes, a large amount of the same contents are contained in the DICOM header "b" in the series of images. By storing only information of different portions, therefore, remarkable compression of the DICOM information can be implemented.

Figure 3:
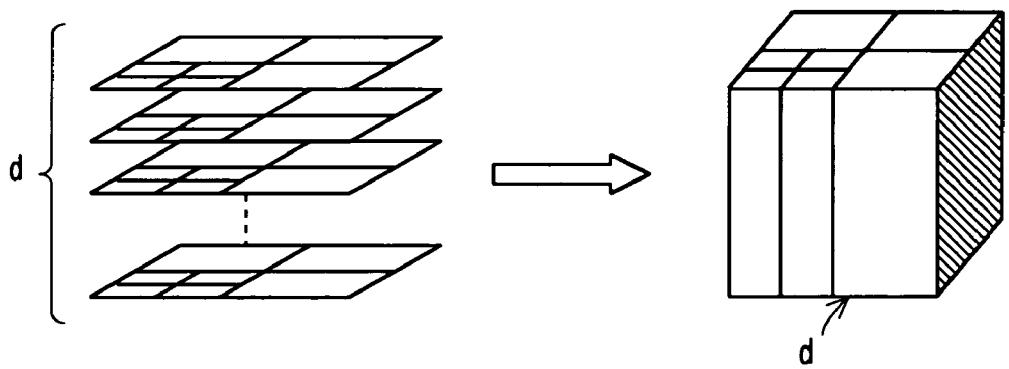
FIG. 3 is a diagram showing two-dimensional volume data.

A two-dimensional image "c" formed of pixel data with the header separated in the header analysis unit 1 is sent to a two-dimensional transform unit 2. In the two-dimensional transform unit 2, each image is subjected to subband decomposition, which is two-dimensional frequency decomposition, as shown in FIG. 3, and two-dimensional divided volume data "d" decomposed only in a two-dimensional direction (here in the x and y directions) is obtained. As an example of the two-dimensional transform, two-dimensional wavelet transform can be used.

Figure 4:
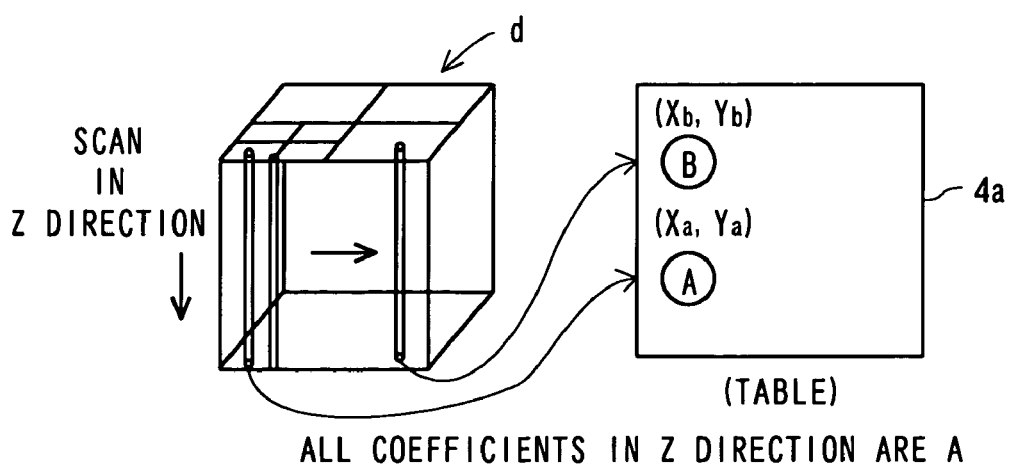
FIG. 4 is a diagram showing operation of a skip section detection and table generation unit.

The two-dimensional divided volume data "d" is sent to a one-dimensional transform unit 3 for conducting one-dimensional frequency decomposition, and a skip portion detection and table generation unit 4. A concept diagram of processing conducted in the skip portion detection and table generation unit 4 is shown in FIG. 4. Coefficients of the two-dimensional divided volume data "d" in x and y coordinates represented as (Xa, Ya) are scanned in the z direction. If all coefficient values are the same (A shown in FIG. 4), then its line is regarded as non-encoded subject line and encoding processing is not conducted on the line. Therefore, the coefficient value A is stored in a table 4a serving as storage means. In the same way, a coefficient value "B" that remains unchanged in the z direction is stored in the table 4a. The table 4a thus created is compressed in a table compression unit 6, and it is added to a file finally generated in a file generation unit 10, as header information.

Figure 5:
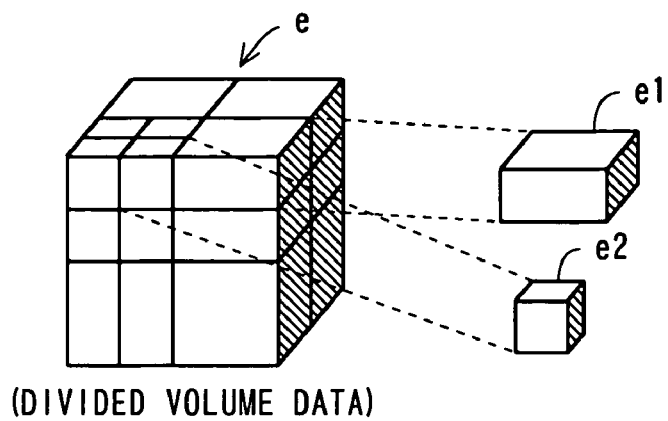
FIG. 5 is a diagram showing subband blocks obtained by subband division processing.

In the one-dimensional transform unit 3, lines that are not non-encoded subject lines in the table created by the table generation unit 4 are subject to subband division in the z direction. A concept diagram of volume data "e" thus obtained is shown in FIG. 5. In subsequent processing, the table 4a is referenced as occasion demands, and processing of coefficients on the non-encoded subject lines is skipped.

Subsequently, subband blocks e1, e2, . . . obtained by the subband division processing are each subjected to adaptive entropy encoding independently. First, each of the subband blocks e1, e2, . . . is divided into further smaller blocks (unit blocks) in a unit block division unit 5. Subsequently, in a statistical value calculation and classification unit 7, statistical values, such as an average value and a variance value of coefficients, are calculated for each unit block, and unit blocks are classified on the basis of the statistical values.

Figure 6:
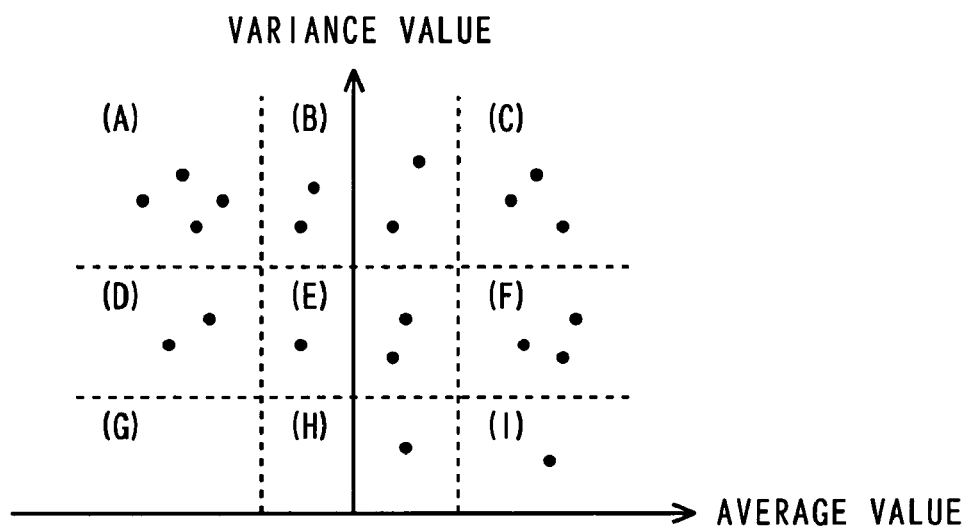
FIG. 6 is a diagram showing classification of unit blocks according to statistical values.

FIG. 6 shows a technique for classification. A graph having the abscissa indicating the average value of the coefficients and the ordinate indicating the variance value is prepared. The average values and variance values of the coefficients calculated for respective unit blocks are plotted on the graph. Classification into classes (A) to (I) is performed according to the magnitude of the average values and the variance values.

In an entropy encoding unit 8, a parameter for entropy encoding is determined by statistical properties of all coefficients in all unit blocks included in each class. Here, a Golomb-Rice (GR) code is used as an example. The GR code has a feature that entropy encoding adapted to the variance of coefficients to be encoded can be performed simply by adjusting one parameter "k". In general, when dividing the encoding subject into a plurality of blocks and encoding resultant blocks, each block is GR-encoded by using the optimum parameter "k". As a result, a higher encoding efficiency can be obtained. However, it becomes necessary to add information of the parameter "k" to each block, resulting in a problem of an increased data amount.

In the present embodiment, however, the problem can be solved by assigning one parameter "k" to blocks having the same statistical property and storing only its association table. The association table is generated for each subband. This association table is compressed in a table compression unit 9, and added to a file finally generated in a file generation unit 10, as header information of the subband block. Encoded data encoded adaptively in the entropy encoding unit 8 is sent to the file generation unit 10. In the file generation unit 10, the header information is added to the encoded data and output.

Furthermore, it is possible to conduct hierarchical readout, transmission, decoding and display on the encoded data generated according to the present invention by applying the preceding technique disclosed in Japanese Patent Application Laid-Open Publication No. 2002-204168 cited above. If the present invention is used for encoding, for example, a DICOM file, the DICOM file can be compressed as it is at a high degree. Furthermore, since the original file can be obtained perfectly by decoding, the present invention can be applied to a medical archive system. Furthermore, since it becomes possible to conduct hierarchical readout, transmission, decoding and image display, owing to the hierarchy of data generated according to the present invention, it can be anticipated that more flexible network utilization of medical data becomes possible.

As evident from the foregoing description, the present invention brings about not only the encoding efficiency improving effect owing to the three-dimensional subband encoding, but also another encoding efficiency improving effect because lines in which all values in the third direction (z direction) are the same are not encoded.

Furthermore, since adaptive entropy encoding is performed for each of unit blocks obtained by dividing a subband into smaller blocks, the encoding efficiency can be improved.

Properly speaking, it is necessary to add an encoding parameter to each unit block. In the present invention, however, the same parameter is used for unit blocks having similar statistical properties, and the parameters are held collectively. Reduction of the overhead also brings about a reduction in size of the generated file.

In addition, accompanying header information other than the pixel information is separated from the pixel information and compressed. In the case where the present invention is used for encoding a DICOM file or the like, therefore, a remarkable compression effect of accompanying header information can be anticipated.

What is claimed is:

1. A volume data encoder for encoding volume data that are image data having a three-dimensional spatial pixel arrangement, the volume data encoder comprising:

a two-dimensional transform unit for conducting two-dimensional frequency decomposition along a first and a second dimensions on two-dimensional consecutive images;

skip detection means for detecting the same data portion which can be skipped in a one-dimensional frequency decomposition and an encoding processing, when further conducting the one-dimensional frequency decomposition and subsequent encoding processing on transform coefficients obtained from the two-dimensional transform unit;

a one-dimensional transform unit for conducting the one-dimensional frequency decomposition except the portion detected by the skip detection means which can be skipped; and an encoding processing unit for conducting encoding on data subjected to the frequency decomposition in the one-dimensional transform unit, except the portion which can be skipped.

2. The volume data encoder according to claim 1, further comprising storage means for storing a result of detection conducted by the skip detection means.

3. The volume data encoder according to claim 1, comprising:
   a unit block division unit for dividing inside of a subband block, which is obtained by conducting three-dimensional frequency decomposition on volume data obtained by conducting the two-dimensional and the one-dimensional frequency decompositions, into unit blocks, which are smaller three-dimensional blocks; and
   adaptive encoding means for conducting adaptive encoding on each of the unit blocks with a suitable encoding parameter.

4. The volume data encoder according to claim 2, comprising:
   a unit block division unit for dividing inside of a subband block, which is obtained by conducting three-dimensional frequency decomposition on volume data obtained by conducting the two-dimensional and the one-dimensional frequency decompositions, into unit blocks, which are smaller three-dimensional blocks; and
   adaptive encoding means for conducting adaptive encoding on each of the unit blocks with a suitable encoding parameter.

5. The volume data encoder according to claim 3, comprising:
   means for calculating statistical values of coefficients for each of all unit blocks in the subband;
   means for classifying the unit blocks into classes according to the statistical values; and
   means for storing a result of the classifying,
   wherein the adaptive encoding means uses a common encoding parameter for each of the classes when encoding unit blocks.

6. The volume data encoder according to claim 4, comprising:
   means for calculating statistical values of coefficients for each of all unit blocks in the subband;
   means for classifying the unit blocks into classes according to the statistical values; and
   means for storing a result of the classifying,
   wherein the adaptive encoding means uses a common encoding parameter for each of the classes when encoding unit blocks.

7. The volume data encoder according to claims 2 or 5, comprising means for compressing information held in the detection result storage means according to claim 2 or the classifying result storing means according to claim 5, respectively,
   wherein the compressed result is added to encoded data.

8. The volume data encoder according to claim 1, comprising means for separating header information from pixel information, if information other than the pixel information accompanies each of a plurality of two-dimensional images forming the volume data, as the header information,
   wherein the header information is processed apart from the pixel information, and a result of compression using a common portion of a plurality of kinds of header information is added to encoded pixel data.

9. The volume data encoder according to claim 2, comprising means for separating header information from pixel information, if information other than the pixel information accompanies each of a plurality of two-dimensional images forming the volume data, as the header information,
   wherein the header information is processed apart from the pixel information, and a result of compression using a common portion of a plurality of kinds of header information is added to encoded pixel data.

10. The volume data encoder according to claim 3, comprising means for separating header information from pixel information, if information other than the pixel information accompanies each of a plurality of two-dimensional images forming the volume data, as the header information,
    wherein the header information is processed apart from the pixel information, and a result of compression using a common portion of a plurality of kinds of header information is added to encoded pixel data.

* * * * *